ELECTRONIC CIRCUIT IN WHICH THE OPERATING VOLTAGE IS OBTAINED FROM THE HIGH VOLTAGE SIDE OF THE CIRCUIT

Filed Sept. 25, 1964

Inventor
DOUGLAS W. TAYLOR
BY Mueller & Aichele
Attys.

United States Patent Office 3,381,165
Patented Apr. 30, 1968

3,381,165

ELECTRONIC CIRCUIT IN WHICH THE OPERATING VOLTAGE IS OBTAINED FROM THE HIGH VOLTAGE SIDE OF THE CIRCUIT

Douglas W. Taylor, Phoenix, Ariz., assignor to Motorola, Inc., Franklin Park, Ill., a corporation of Illinois Filed Sept. 25, 1964, Ser. No. 399,313
8 Claims. (Cl. 315—27)

ABSTRACT OF THE DISCLOSURE

The circuit includes a semiconductor device coupled in series with an inductance winding and a capacitor. A second semiconductor device is coupled in series with a second capacitor and is operably coupled to the inductance winding. A DC voltage is applied across the second capacitor and a starting voltage is applied across the first capacitor. Pulses developed across the inductance winding are rectified by the second semiconductor device and coupled back to the first capacitor to provide an operating voltage for the first semiconductor device.

In the basic deflection circuit used in television receivers energy is supplied from a direct current power supply, through a switch, to the deflection yoke. The yoke and associated circuitry are essentially inductive so that abrupt closure of the switch results in linear current rise through the yoke, thus providing the desired sawtooth current waveform for deflection of the cathode ray beam. At the end of a predetermined interval (the end of trace) current to the deflection yoke is interrupted and energy stored in the inductance thereof is returned to a storage capacitor. A suitable damping arrangement is provided to prevent ringing once energy has been transferred from the yoke to the storage capacitor, and generally the direct current power supply is called upon to supply only sufficient energy to make up for losses arising from the resistance of the yoke, in the switch, and during energy transfer between the yoke and the storage capacitor.

A transistor or other semiconductor switching device may be utilized as a switch for deflection circuits of the above described type. However, transistors operate at a considerably lower voltage than corresponding vacuum tube circuits, which are ordinarily powered from a simple transformerless rectifier circuit operating directly from line voltage. As a result a costly voltage step-down arrangement is usually required to provide a direct current operating voltage for a transistorized deflection system and for other transistor stages which may be present in the receiver. In other instances the transistor switch of the deflection system, as well as other stages of the receiver, may be operated from a low voltage direct current supply (such as a battery pack), while still other vacuum tube stages are operated from a substantially higher direct current supply. For example, although transistors may perform all of the various functions of a television receiver, it may not be economical to do so with transistors presently available in commercial quantities. Accordingly, there may be a transitional period of development wherein hybrid receivers are in vogue, that is, receivers having a combination of transistor and vacuum tube circuits. For these and other reasons it is highly desirable to provide a transistorized deflection system which may be operated either at relatively high voltages, derived from a transformerless power supply operating from line voltage (producing a direct current voltage in the range of 100–140 volts depending on the filtering used), or from the low voltage source such as a battery pack (providing a direct current voltage in the range of 10–20 volts). Advantageously, such a system should also provide either up-conversion or down-conversion of the available direct current voltage so that an operating voltage of appropriate magnitude is available for powering additional stages (either transistor or vacuum tube) which may be employed in the receiver.

It is therefore an object of the invention to provide a transistorized deflection system for a television receiver which may be operated from either a high or a low voltage direct current supply.

A further object of the invention is to provide a DC-to-DC converter which may conveniently be operated in conjunction with a transistorized horizontal deflection system of a television receiver.

Another object of the invention is to provide a DC-to-DC converter which may be operated as an up-converter or a down-converter, depending on source and load connections.

Still another object of the invention is to provide a transistorized horizontal deflection system for television receivers which may be operated directly from the DC voltage provided by transformerless rectification of AC line voltage, and which system includes a low-voltage DC source for powering additional transistor stages in the receiver.

Other objects, as well as the features and attending advantages of the invention will become apparent from the following description when taken in conjunction with the accompanying drawings, in which:

FIG. 1 is a schematic drawing of one embodiment of the invention;

FIG. 1*a* is a plot of waveforms appearing in the circuit of FIG. 1 and helpful in understanding the operation of the circuit of FIG. 1;

The horizontal deflection and DC-to-DC converter system of the invention includes a transformer having at least one winding thereon, with one side of the winding returned to a reference potential by a first capacitor, and the other end of the winding returned to the reference potential through a first semiconductor switch and also to the reference potential through a second semiconductor switch in series with a second capacitor. A third capacitor is coupled across the winding and adapted to ring with the effective inductance of the winding (which inductance may include the inductance of the deflection yoke coupled therewith), and a damper diode is coupled across the third capacitor to restrict the ringing to one-half cycle of oscillation. A direct current operating voltage is applied across either the first or the second capacitor, and the first semiconductor switch is periodically switched between states of conduction and non-conduction by a driving wave while the second semi-conductor switch is synchronously switched between states of non-conduction and conduction. This produces a linearly rising current wave through the transformer winding when the first semiconductor switch is conducting (which wave may be utilized to energize the deflection yoke of a cathode ray tube), and also develops a direct current voltage of a desired magnitude across the other of the first and second capacitors during conduction of the second semiconductor circuit (when the first semiconductor switch is non-conducting).

Figures 1, 1A:
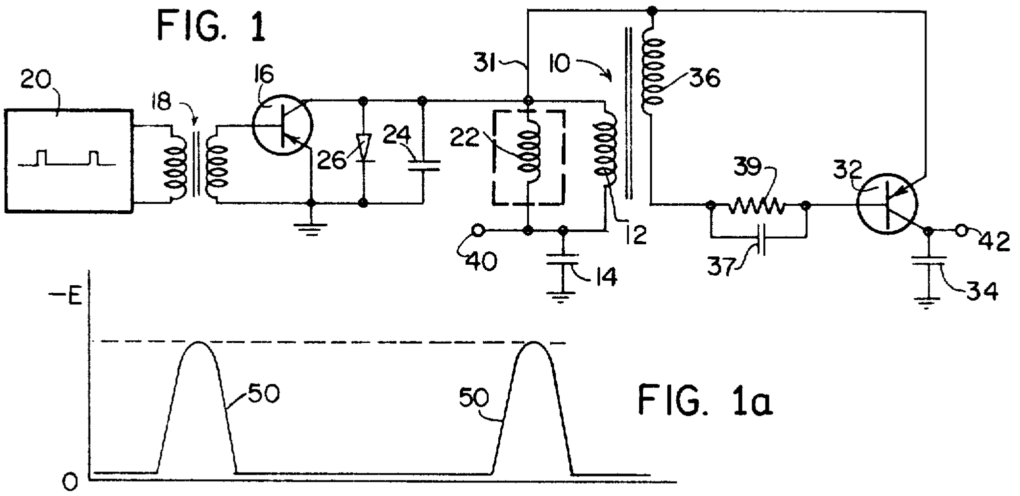

Referring now to FIG. 1, winding 12 of transformer 10 has one end returned to ground reference potential through capacitor 14. The other end of winding 12 is connected to the collector of transistor 16. The emitter of transistor 16 is returned to ground reference potential. A driving signal for transistor 16 is coupled between its base and emitter as, for example, by coupling transformer 8. This driving signal may be a square wave pulse genrated by driving source 20, which source may coneniently be a multivibrator or a blocking oscillator ircuit arrangement. When the circuit of the invention is tilized in conjunction with the deflection yoke of a teleision receiver, driving source 20 may produce pulses ecurring at horizontal deflection frequency.

Inductance 22 is connected across winding 12. Typicaly inductance 22 may be the deflection yoke of the cathde ray tube of a television receiver. However, inducance 22 may take other forms, and may be made variable or the reasons subsequently discussed. It is to be undertood that inductance 22 includes, or may be solely, the ffective reflected inductance of winding 12, depending n the type and application of further windings appearng on transformer 10.

Capacitor 24 is coupled between the collector and mitter of transistor 16. Diode 26 shunts capacitor 24. The value of capacitor 24 is selected to resonate with nductance 22 at the predetermined frequency. When inluctance 22 is provived by the deflection yoke of a teleision receiver, this frequency is such that the period of one-half cycle of oscillation is substantially equal to he retrace period or flyback time of the horizontal deection wave applied to the yoke. Diode 26 functions as a damper diode to limit the resonance between inductance 22 and capacitor 24 to one-half cycle of oscillation.

The collector of transistor 16 is also connected, via ead 31, to the emitter of transistor 32. Capacitor 34 is onnected between the collector of transistor 32 and round reference potential. A driving signal for transistor 32 is applied between its base and emitter and is synchronized and phased with respect to the driving signal for ransistor 16 such that transistor 32 is cutoff when tranistor 16 is conducting, and may become conductive luring the time transistor 16 is cutoff. In the embodinent of FIG. 1, the driving signal for transistor 32 is produced by winding 36 on transformer 10, with windng 36 being connected so that transistor 32 (normally cutoff) is pulsed on by the tips of the retrace or flyback pulses of the deflection wave induced therein. Capacitor 37 and resistor 39 function to provide additional turn-off bias for transistor 32, thus narrowing the conduction period of transistor 32 so that conduction occurs only at the peak of the retrace pulses induced in winding 36.

Terminal 40 is connected to the junction point between winding 12 and capacitor 14. Terminal 42 is connected between the junction point of the collector of transistor 32 and capacitor 34. A direct current operating voltage which may be on the order of 10 to 20 volts is applied to terminal 40, with a direct current voltage of a different magnitude such as 100 to 140 volts available at the erminal 42 for supplying a load such as additional stages of the receiver.

Assuming inductance 22 to be provided by the deflecion yoke of a television receiver, and assuming a low voltage applied to terminal 40, the circuit of FIG. 1 operates to provide the desired deflection wave for the yoke and to produce a step-up in direct current voltage, as appearing at terminal 42, in the following manner. Negative-going portions of the driving wave produced by driving source 20 and coupled between the emitter and base of transistor 16 via transformer 18 causes transistor 16 (shown as a PNP transistor) to conduct. The width of the negative-going portion of this driving wave corresponds to the trace portion of the deflection wave required for the yoke of the receiver. When transistor 16 conducts, current flows from terminal 40, through winding 12, and through the collector-emitter junction of ransistor 16 to ground reference potential. Since windng 12 is highly inductive, this current flow has a linearly rising slope to produce a sawtooth current wave in windng 12. This, in turn, is coupled across inductor 22 to provide the required sawtooth current wave for the deection yoke of the receiver.

When this current has reached a desired peak, transistor 16 is turned off by the positive-going portion of the driving wave provided by driving source 20. The width of the positive-going portion of the driving wave corresponds to the retrace portion of the deflection wave. When transistor 16 is turned off, ringing action between inductance 22 and capacitor 24 commences and continues for one-half cycle of oscillation. Voltage reversal across capacitor 24 is prevented by diode 26 which provides a shunt path to ground, and further ringing is inhibited. The net result is a transfer of the energy stored in inductance 22 during the trace portion of the deflection wave to capacitor 24 during the retrace portion of the deflection wave.

The ringing between inductance 22 and capacitor 24 produces a half-wave sinusoidal voltage pulse in winding 12 during retrace, which pulse is also induced in winding 36. By proper selection of the sense of winding 36 this pulse may be supplied as a negative-going pulse to turn transistor 32 (shown as a PNP transistor) on. Further, and because of the biasing action of resistor 39 and capacitor 37, transistor 32 may be turned on for substantially all or any lesser portion of the retrace period, determined by the ringing between inductance 22 and capacitor 24. For example, transistor 32 may conduct only at the very tips of voltage pulses 50, as illustrated in FIG. 1*a*. When transistor 32 conducts, the voltage is developed across capacitor 34 that is equal to the magnitude E (FIG. 1*a*) of pulses 50 that causes conduction, and this voltage in turn is available at terminal 42.

The magnitude of retrace voltage pulses 50 of FIG. 1*a* is a function of the direct current voltage applied to terminal 40, the turns ratio between windings 12 and 36 and the relative trace-to-retrace time ratio of the deflection wave. Since in television deflection systems the trace-to-retrace ratio is normally fixed, the value of voltage pulses 50 depends only on the voltage applied to terminal 40 and on the turns ratio of windings 12 and 36. As mentioned, conduction of transistor 32 causes capacitor 34 to assume a direct current voltage equal to the peak amplitude of pulses 50 (for a narrow conduction interval), which in a practical circuit may be in the order of 100–140 volts. This voltage may be derived at terminal 42 for powering additional stages of the receiver; for example, for supplying anode voltage for various vacuum tube circuits which may be present in a hybrid receiver.

Figure 2:
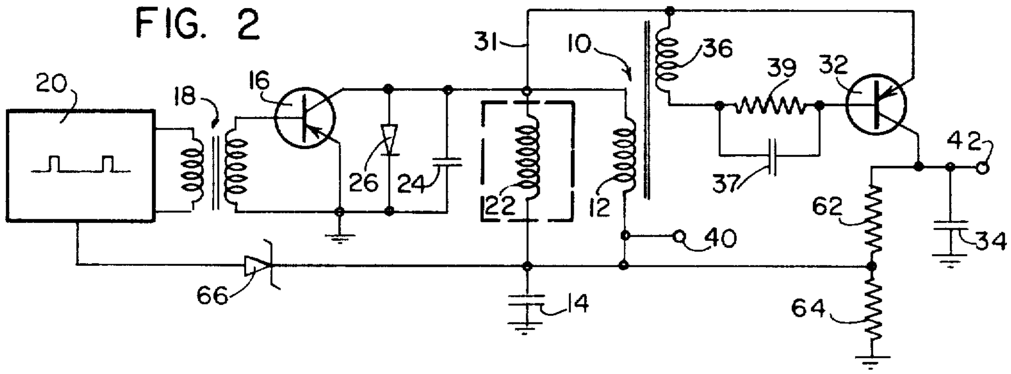
FIG. 2 is a schematic drawing of another embodiment of the invention.

FIG. 2 illustrates an embodiment of the invention adapted to provide down-conversion of the direct current voltage available for operating the deflection system. In this instance a relatively high direct current voltage is applied to terminal 42 and a low voltage, which may be utilized for powering additional transistor stages of the receiver, is derived from terminal 40. The applied direct current voltage may be obtained from a transformerless rectifier arrangement operating directly from AC line voltage. Typically, with 117 volts AC line voltage, the output of the rectifier may supply 100 volts (choke input filter) or 140 volts (capacitor input filter). This will conveniently supply a voltage at terminal 40 in the range of 10–20 volts.

When operating the circuit as a down-converter it is necessary to supply a starting voltage across capacitor 14 that is somewhat less than the voltage provided at terminal 40 during normal operation. Also, application of the driving wave (provided by driving source 20) should be delayed until the desired starting voltage level is developed across the capacitor 14. To this end, a voltage divider, including resistors 62 and 64, may be provided between terminal 42 and ground reference potential. The tap point of resistors 62 and 64 is then connected to the junction of capacitor 14 and winding 12. Delay in the onset of the driving wave from driving source 20 may be achieved by coupling an avalanche breakdown diode between capacitor 14 and driving source 20. Thus driving source 20 (which may be a multivibrator or a blocking oscillator) would be normally biased off and when the voltage across capacitor 14 reaches a predetermined magnitude, diode 66 breaks down to supply a starting bias to driving source 20.

When the circuit of FIG. 2 is operating capacitor 14 is charged during each cycle by current through diode 26. Energy lost in the system is restored during the retrace portion of the cycle by conduction of transistor 32 which is turned on at the peak of the retrace pulses induced in winding 36. This functions to raise the level of the retrace pulses to the level of the voltage applied to terminal 42, thus restoring lost energy to the system. For a given turns ratio between windings 12 and 36 and for a fixed trace-to-retrace ratio, the down-conversion ratio is also fixed the same as the up-conversion ratio.

Figure 3:
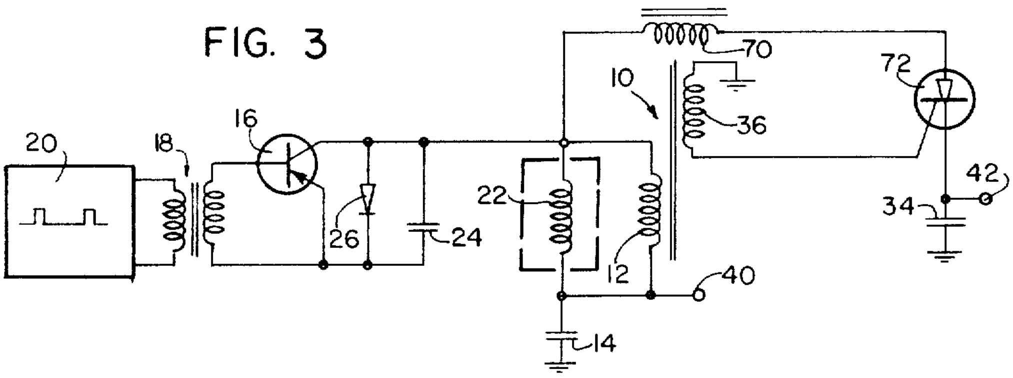
FIG. 3 is a schematic drawing of a still further embodiment of the invention.

The circuit of FIG. 3 is an example of an embodiment in which the switching action provided by transistor 32 may be carried out by a semiconductor control rectifier (SCR) instead of a transistor. To this end, inductor 70 is connected between the anode of SCR 72 and the side of winding 12 common with the collector of transistor 16. The cathode of SCR 72 is returned to ground reference potential by capacitor 34. One side of winding 36 is returned to ground reference potential and the other side thereof is connected to the gate electrode of SCR 72. Retrace or flyback pulses induced in winding 36 trigger SCR 72 into conduction. Inductor 70 is selected to be in series resonance with capacitor 34 at a frequency such that one-half cycle of oscillation is somewhat less than the retrace interval. Thus when SCR 72 is triggered, ringing begins between inductor 70 and capacitor 34. However, since SCR 72 is a unidirectional conductive device the circuit rings only for one-half cycle at which time current therethrough passes through zero and attempts to reverse. At this time the current is less than the holding current requried to maintain SCR 72 conducting and it turns off.

The circuit of FIG. 3 may be operated to provide up-conversion when a relatively low valued DC voltage is applied to terminal 40 or to provide down-conversion when a relatively high valued DC voltage is applied to terminal 42. In this latter instance the same starting considerations as shown and discussed in conjunction with FIG. 2 apply.

The above described circuit embodiments of the invention may be utilized to perform up-conversion and down-conversion in the manner discussed in applications other than those supplying deflection waves to the yoke of a television receiver. In this instance inductance 22 (which may be provided by a fixed inductor or which may be the effective primary inductance of winding 12) may be made variable along with capacitor 24 so that the trace-to-retrace ratio of the system becomes variable. As discussed, this in turn allows the ratio of up-conversion or down-conversion to be varied in a desired manner.

In addition, transistor 32 (or SCR 72) may be driven from an independent source operating synchronously with driving source 20. This would enable, for example, differentiation and delay of the output wave of driving source 20 to eliminate the starting arrangement for capacitor 14. Also in some instances diode 26 may be eliminated and the required damping achieved by reverse current in the collector-to-emitter junction of transistor 16. This action, however, may give rise to emitter-base breakdown and accordingly the use of diode 26 is preferred.

The invention provides, therefore, an improved deflection system for television receivers operable to generate deflection waves for the receiver and for providing a direct current voltage for powering various stages of the receiver. The system provides either up-conversion or down-conversion of an applied direct current voltage, and may be operated from a relatively high voltage source (such as provided by transformerless rectification of line voltage) or from a relatively low voltage source (such as a battery pack). In addition, the DC-to-DC conversion aspects of the system may be used for other applications than television deflection systems, in which instance the DC conversion ratio is readily variable.

I claim:

1. A DC-to-DC converter including in combination, transformer means having at least first and second windings thereon, inductance means coupled across said first winding, a transistor having collector, emitter and base, means connecting the collector and emitter of said first transistor in circuit between one side of said first winding and a reference potential, a first capacitor coupled between the other side of said first winding and said reference potential, semiconductor switching means and a second capacitor coupled in series between said one side of said winding and said reference potential, with said second winding operably coupled to said semiconductor switching means to control the conductive state thereof, a third capacitor coupled between said one side of said first winding and said reference potential, said first capacitor adapted to ring with said inductance means, a semiconductor diode coupled across said third capacitor to limit the ringing of said third capacitor and said inductance means to one-half cycle of oscillation, a first terminal adapted to receive a direct current voltage of a first magnitude connected to the common point of said second capacitor and said semiconductor switching means, a second terminal connected to the side of said first capacitor common to said other side of said first winding, a voltage divider connected between said first terminal and said reference potential, means connecting the tap point of said voltage divider to said second terminal, control circuit means coupled between the base and emitter of said first transistor operable to periodically switch the same between states of conduction and non-conduction, and delay circuit means including a breakdown diode coupled between said second terminal and said control circuit means to delay operation of said control circuit means, until said first capacitor has charged to a predetermined voltage level, whereby a direct current voltage of a magnitude less than said first magnitude is provided at said second terminal.

2. A circuit operable to provide deflection waves for the cathode ray tube of a television receiver and to provide a direct current voltage for powering the receiver, including in combination, transformer means having first and second windings thereon, means for coupling the deflection yoke of the cathode ray tube of the receiver across said first winding, first semiconductor switching means coupled between one side of said first winding and a reference potential, a first capacitor coupled between the other side of said first winding and said reference potential, second semiconductor switching means and a second capacitor coupled in series between said one side of said first winding and said reference potential, with said second winding operably coupled to said second semiconductor switching means to control the conductive state thereof, a third capacitor coupled between said one side of said first winding and said reference potential, said third capacitor adapted to ring with the effective inductance of the deflection yoke, a semiconductor diode connected across said third capacitor to limit the ringing of said third capacitor and the effective inductance of the deflection yoke to one-half cycle of oscillation, means for applying a direct current voltage across said second capacitor, a starting circuit coupled between said first and second capacitors to provide a starting voltage for said first semiconductor switching means, means for deriving a direct current voltage from across said first capacitor, and circuit means coupled to said first semiconductor switching means operable to periodically switch the same between states of conduction and non-conduction.

3. A circuit operable to provide deflection waves for the cathode ray tube of a television receiver and to provide a direct current voltage for powering the receiver, cluding in combination, transformer means having at ast first and second windings thereon, means for couing the deflection yoke for the cathode ray tube of .e receiver to said first winding, a first transistor having ›llector, emitter and base, means connecting the collector ıd emitter of said first transistor in circuit between one de of said first winding and a reference potential, a :st capacitor coupled between the other side of said first inding and said reference potential, a second transtor having collector, emitter and base, a second capaci- ›r, means connecting said collector and emitter of said :cond transistor and said second capacitor in series beveen said one side of said first winding and said reference ›tential, means coupling said second winding between ıe emitter and base of said second transistor, a third ıpacitor connected between said one side of said first inding and said reference potential, said third capacitor lapted to ring with the effective inductance of the de- :ction yoke, a semiconductor diode connected across ıid third capacitor to limit the ringing of said third ıpacitor and the effective inductance of the yoke to onealf cycle of oscillation, means for applying a direct cur- :nt voltage across said second capacitor, a starting circuit ›upled between said first and second capacitors to proide a starting voltage for said first transistor, means for :riving a direct current voltage from across said first ıpacitor, and circuit means coupled between the base and nitter of said first transistor to periodically switch the ıme between states of conduction and non-conduction.

4. A circuit operable to provide deflection waves for ıe cathode ray tube of a television receiver and to proide a direct current voltage for powering the receiver, ıcluding in combination; first semiconductor switch ıeans having an input electrode and a pair of output elec- :odes, inductance means and first capacitor means couled in series with said output electrodes, second semionductor switch means and second capacitor means couled in series, said second inductance means being operaly coupled to said second semiconductor switch means › control the conduction thereof, means to supply a irect current voltage to said second capacitor means, tarting means coupled from said second capacitor means › said first capacitor means to provide a starting voltge for said first semiconductor switch means, control ciruit means coupled to said input electrode for periodically witching said first semiconductor switching means beween states of conduction and non-conduction to provide ›ulses in said inductance means for rectification by said second semiconductor switch means to provide a supply voltage across said first capacitor means.

5. The circuit set forth in claim 4 wherein said induct ance means comprises a transformer having first and second windings, with said first winding being coupled in series with said pair of output electrodes and said first capacitor means, and with said second winding being coupled to said second semiconductor switch means and providing the operable coupling thereto.

6. The circuit set forth in claim 4 wherein said starting means comprises a voltage divider coupled across said second capacitor means, and means coupling an intermediate point of said voltage divider to said first capacitor means.

7. The circuit set forth in claim 4 further including delay circuit means coupled between said first capacitor means and said control circuit means to delay operation of said control circuit means until said first capacitor means is charged to a predetermined voltage level.

8. The circuit set forth in claim 4 wherein said inductance means comprises a transformer having first and second windings, with said first winding being coupled in series with said pair of output electrodes and said first capacitor means, wherein said second semiconductor switch means has input, output and control electrodes, wherein said second winding is inductively coupled to said first winding and is coupled in series with said input and common electrodes of said second semiconductor switch means, and wherein said output and common electrodes of said semiconductor switch means is coupled in series with said second capacitor means, and said common electrode is coupled to the junction of said first winding and an output electrode of said first semiconductor switch means.

References Cited

UNITED STATES PATENTS

| | | | |
|---|---|---|---|
| 3,070,737 | 12/1962 | Johnson et al. | 321—2 |
| 3,200,288 | 8/1965 | Tanner | 315—27 |
| 3,205,401 | 9/1965 | Fyler et al. | 315—27 |
| 3,210,601 | 10/1965 | Walker | 315—27 |
| 3,300,680 | 1/1967 | Saudinaitis | 315—29 |
| 3,310,705 | 3/1967 | Nicholson | 315—27 |

ROBERT L. GRIFFIN, *Primary Examiner.*

JOHN W. CALDWELL, *Examiner.*

R. K. ECKERT, *Assistant Examiner.*